United States Patent Office 2,848,514
Patented Aug. 19, 1958

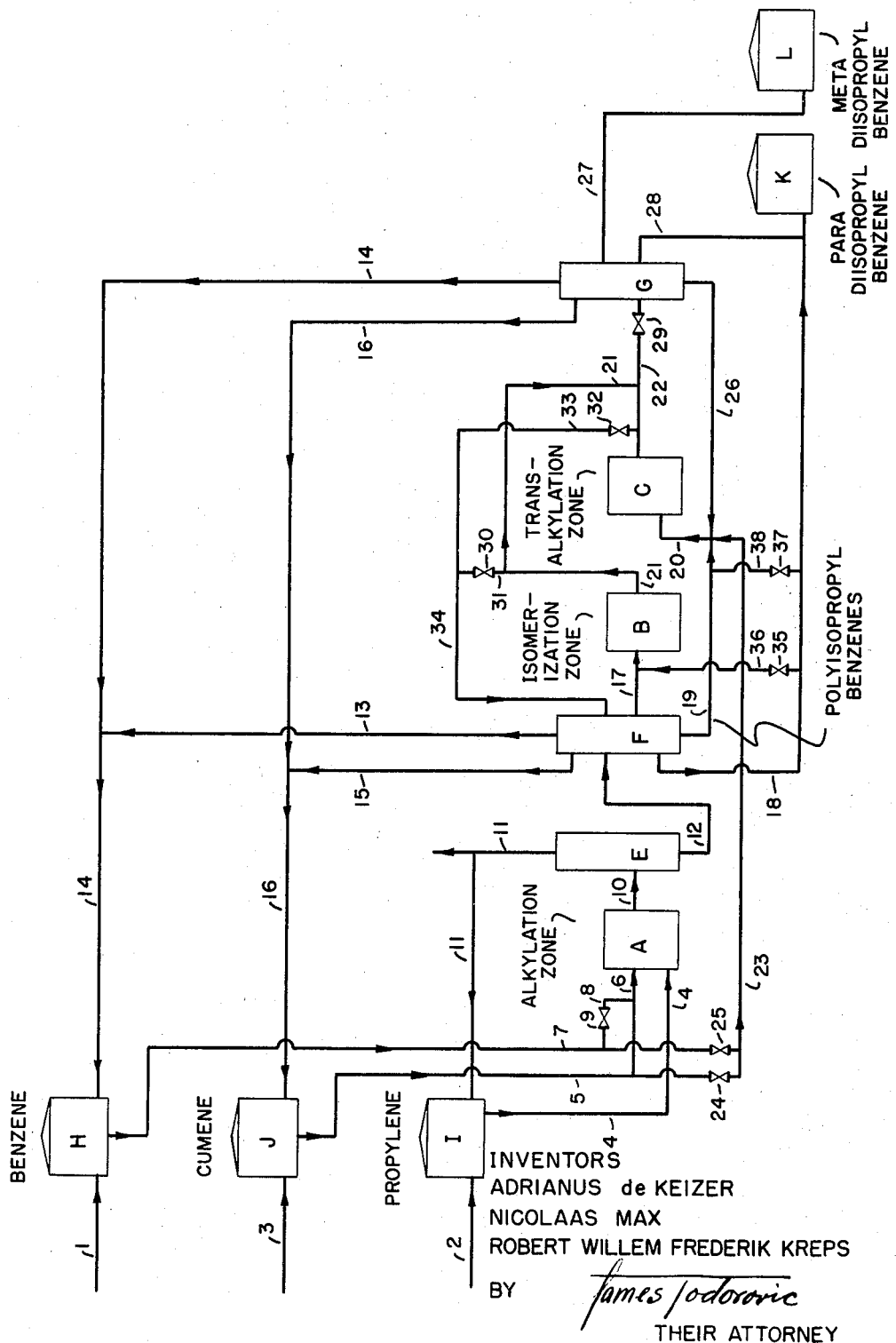

2,848,514

PROCESS FOR PRODUCING DIISOPROPYL BENZENES

Adrianus de Keizer, Nicolaas Max, and Robert Willem Frederik Kreps, Amsterdam, Netherlands, assignors to Shell Development Company, New York, N. Y., a corporation of Delaware Application July 14, 1955, Serial No. 522,000

Claims priority, application Netherlands July 30, 1954

4 Claims. (Cl. 260—671)

This invention relates to a process for the continuous production of at least one of the diisopropyl benzene isomers of ortho-diisopropyl benzene, i. e. the production of para-diisopropyl benzene and/or meta-diisopropyl benzene.

Para-diisopropyl benzene is generally considered the most valuable isomer of diisopropyl benzene as it is a suitable starting material for the preparation of terephthalic acid which, in turn, may be employed in the production of certain synthetic fibers including that known as "Dacron." Meta-diisopropyl benzene is also valuable, since it may be employed as a starting material in the preparation of isophthalic acid, which may be reacted to form esters which are useful as plasticizers for plastics or as starting materials for synthetic fibers. The meta-diisopropyl benzene may also be converted into the mono- or di-hydroperoxide which may be decomposed to produce, i. e., meta-isopropyl phenol and resorcinol, respectively, as well as acetone. The ortho-isomer is not known to have commercial utility.

The boiling points of the diisopropyl benzenes are such that the para-isomer may be recovered from a mixture of them by commercial fractional distillation. However, the meta- and ortho-isomers boil so closely together that their separation by commercial fractional distillation is not possible.

The principal object of the present invention is to provide a cyclic and continuous process for the production of para-diisopropyl benzene and meta-diisopropyl benzene or either of them in substantial yield in a process which minimizes the net production of ortho-diisopropyl benzene. This object will be better understood, and others will appear, from the description of the invention, which will be made with reference in part to the accompanying drawing, wherein: The sole figure of the drawing is a flow diagram illustrating a preferred mode of practicing the present invention.

The present invention takes advantage of the fact that it has been found possible by a process of isomerization and by a process of transalkylation to selectively convert a fraction containing a substantial proportion of ortho-diisopropyl benzene into a product containing no more than about 5% ortho-isomer among the total diisopropyl benzenes.

In broad outline, the process of the present invention is a method for producing para- and/or meta-diisopropyl benzene by a combination of the following steps. In an alkylation zone, propylene is reacted with benzene or with cumene recovered from transalkylation product discussed below, to form a mixture of diisopropyl benzene isomers as well as polyisopropyl benzenes. From the alkylation product there are separated by fractional distillation a polyisopropyl benzene fraction, a para-diisopropyl benzene fraction which may be recovered as ultimate product, and a mixture of ortho- and meta-diisopropyl benzenes which is charged to the isomerization zone where it is converted to a product consisting mainly of diisopropyl benzenes containing no more than 5% of the ortho-isomer. The said polyisopropyl benzene fraction is reacted in the transalkylation zone with at least an equal amount of benzene or cumene or a mixture thereof to form a product containing a substantial proportion of diisopropyl benzenes containing less than 5% of the ortho-isomer. The product from the alkylation zone as well as the products from isomerization and transalkylation may contain benzene and cumene, which may be recovered by fractionation for reuse in the alkylation or transalkylation zones. The isomerization product and the transalkylation product are fractionated separately or in admixture to recover a fraction consisting essentially of para-diisopropyl benzene and one consisting essentially of meta-diisopropyl benzene, which may be recovered as ultimate products of the process. The process may be operated to recover essentially only para-diisopropyl benzene, in which case the preferred operation consists of returning the total transalkylation product to the fractionation step following the alkylation zone so that the meta-isomer is recycled through the isomerization zone to extinction. The process may also be operated to produce essentially only meta-diisopropyl benzene, in which case the para-fractions separated in the fractionations following alkylation and following transalkylation may be returned either to the isomerization zone or to the transalkylation zone for ultimate conversion to the meta-isomer.

The alkylation, isomerization and transalkylation are all preferably operated in liquid phase in the presence of a cracking catalyst of the silicate type. The details of these operations will be described below.

The process of the invention will be described more particularly with reference to the flow diagram in the drawing, which shows a preferred mode of practicing the present invention.

The major operating steps of the process are carried out in alkylation zone A, isomerization zone B, transalkylation zone C and in fractionation zones E, F and G. Fresh benzene feed to the process may be added through line 1 into tank H; fresh propylene feed through line 2 into tank I; and, if desired, cumene may be added from an outside source through line 3 into tank J, although in the preferred operation cumene is generated within the process. The para- and meta-diisopropyl benzene product of the process may be stored in product tanks K and L respectively.

In the operation of the process, proylene is charged to alkylation zone A through line 4 and cumene through lines 5 and 6. If desired, benzene may be charged through lines 7 and 8 by opening valve 9. The alkylation zone is operated with a cracking catalyst at the conditions described below to produce diisopropyl benzenes as major product. Effluent from alkylation zone A is withdrawn through line 10 and charged to distillation column E. Column E is operated as a stabilizer to separate any propylene that may remain in the product, as well as propane if it was originally present in the propylene charge. These gases are withdrawn as overhead through line 11. If desired, all or part of the propane may be removed from this stream by means not shown and propylene returned to tank I.

Stabilized alkylation effluent is withdrawn from column E through line 12 and charged to distillation zone F. Although distillation zone F is shown as a single rectangle, it will preferably comprise a number of distillation columns operating in a specified manner to produce the following separate fractions: Benzene, if present in the alkylation effluent, is withdrawn through line 13 for return through line 14 to tank H. Cumene is withdrawn through line 15 for return through line 16 to tank J. A cut comprising essentially meta- and ortho-diisopropyl benzene is withdrawn through line 17 to be charged to isomerization zone B. A cut comprising essentially para-diisopropyl benzene is withdrawn through line 18 and may be sent directly to product tank K. A mixture of polyisopropyl benzenes comprising mainly triisopropyl benzenes is withdrawn as bottoms product through line 19 and is charged through line 20 to transalkylation zone C. The fractionation zone should be operated by charging the total feed to a column in which the lightest fraction is taken overhead and the remaining bottoms is charged to the next column, in which the lightest remaining product is taken overhead and the bottoms again charged to the next column. In this manner all the diisopropyl benzenes are ultimately recovered as distillates, and their thermal degradation is avoided altogether, or minimized.

The isomerization zone and transalkylation zone are preferably operated in liquid phase with a silica alumina type cracking catalyst under conditions described below.

Isomerization zone B is operated under conditions selected to convert the diisopropyl benzenes charged thereto selectively into a mixture of diisopropyl benzenes containing no more than 5% thereof as ortho-isomer. The isomerization effluent is withdrawn through line 21 and is preferably passed through line 22 to fractionation zone G.

The charge which enters transalkylation zone C from line 20 comprises the polyisopropyl benzenes from line 19 and either cumene from tank J or benzene from tank H or both. Cumene is passed to line 20 through line 23 by opening valve 24 in line 5 and benzene is charged through line 23 by opening valve 25 in line 7. Polyisopropyl benzenes not converted in transalkylation zone C are eventually returned thereto from fractionation zone G through lines 26 and 20.

Transalkylation zone C is operated under conditions selected to convert the various materials charged into a product comprising a large proportion of diisopropyl benzenes containing no more than 5% thereof in the form of ortho-isomer. Effluent from transalkylation zone C passes through line 22 to fractionation zone G. Fractionation zone G may represent a number of separate fractionating columns operating in a manner similar to fractionation zone F. The fractions withdrawn from zone G include benzene through line 14 for return to tank H, cumene through line 16 for return to tank J, meta-isopropyl benzene containing no more than a small amount of ortho through line 27 for passage to product tank L and para-diisopropyl benzene through line 28 for passage to product tank K.

If it is desired to operate the process of the present invention for the production mainly of para-diisopropyl benzene, it is preferred not to employ a separate fractionating zone G but instead to close valve 29 in line 22 and to open valve 30 in line 31 and valve 32 in line 33 and thus return the total effluents from isomerization zone B and from transalkylation zone C through line 34 into fractionating zone F. In this manner, any meta-diisopropyl benzene present in the effluent from isomerization and transalkylation will be again passed to isomerization zone B through line 17 so that it is ultimately converted to para-diisopropyl benzene by isomerization, since this is the only product actually separated from the process. It will be realized that it may be necessary to remove small bleed streams of heavy polymers or gaseous decomposition products by means of lines not shown.

If it is desired to operate the present process for the production mainly of meta-diisopropyl benzene, the para-diisopropyl benzene fractions in line 18 and line 28 are not passed to tank K for recovery as product but may be charged either to isomerization zone B by opening valve 35 in line 36 or to transalkylation zone C by opening valve 37 in line 38. The former alternative, i. e. charging the para-isomer to the isomerization zone, will be preferred. In this modification of the process it will be necessary to operate fractionation zone G in order to recover meta-diisopropyl benzene of low ortho-diisopropyl benzene content.

Since the above-described drawing is a schematic flow diagram, it will be understood that details of equipment such as specific vessels, pumps, valves, connecting lines and the like are not shown therein. These details will be readily supplied by anyone skilled in the art. The fractional distillation zones E, F and G may represent, for example, one or several conventional fractionating columns such as bubble-tray or packed columns equipped with reboilers and condensers, operating in series or otherwise to recover the several fractions. The reaction zones A, B and C will include necessary equipment such as reactors, heaters to maintain suitable reaction temperatures, pumps, lines, etc. Valves have been shown in only a few lines, to simplify the explanation of the preferred methods of operation.

The aromatic hydrocarbon employed as charge stock in the present invention is cumene, i. e. isopropyl benzene. It is generally preferred to produce this cumene in the process, as described, by charging benzene to one of the alkylation zones, i. e. to alkylation zone A or to transalkylation zone C. The aromatics may be charged in pure form or in admixture with other hydrocarbons, preferentially those which are not converted under conditions of the present process. The benzene, for example, may be present in concentrations of as little as 15 to 50% in liquid mixtures resulting from hydrocarbon conversion processes such as hydroforming, platforming, aromatization, or the like, which are conventionally employed in petroleum refineries and are well-known to the art. The benzene may be employed, for example, in the form of a close-out platformate, or other suitable hydroformate which is a fraction containing no other aromatic hydrocarbon but containing a substantial proportion of non-aromatic hydrocarbon of the same boiling range. It is apparent that in such a case the non-aromatic content of the charge will eventually have to be discharged from the system, for instance by removing a bleed stream from line 14.

Propylene is the only olefin which is employed in the process of the present invention. It may be charged as a highly concentrated cut or diluted with non-olefin, especially propane. In petroleum refineries the $C_3$ cut produced, e. g., in thermal or catalytic cracking processes may contain from 20 or 30 to 80% or more of propylene, the rest being propane. Such cuts are suitable. It is preferred to have at least 40 or 50% propylene present in the fraction employed.

Catalysts suitable in the alkylation, isomerization and transalkylation steps of the present invention belong to the group of cracking catalyst, i. e. those substances which can also serve as catalysts in cracking petroleum. In the process according to the invention, cracking catalysts of the silicate type are preferably used. These catalysts mainly consist of silica while smaller quantities of one or more oxides of other metals such as aluminum, zirconium, magnesium, calcium, sodium, and potassium, are also present which are chemically bound at least in part to the silica to form silicates. Other oxides may also occur in a chemically bound form. Usually water is present in the oxide mass in a free or very loosely bound form. In many instances only traces of certain oxide components occur in the catalysts.

In the process according to the invention, catalysts of the aluminum silicate type are especially preferred, i. e. cracking catalysts mainly consisting of $Al_2O_3$ and $SiO_2$, in which other components, such as those mentioned may be present in small quantities or traces. These catalysts usually have a higher silica than alumina content. A suitable ratio by weight is, for example, 70–90% by weight of $SiO_2$ and 30–10% by weight of $Al_2O_3$.

In the process of the invention it is desirable that the catalyst have a high activity. It has been found that the water content of the catalyst has a great influence on the activity and that catalyst having a water content greater than 3.5% by weight is not sufficiently active to be useful in the present invention. In general, water contents lower than 2% by weight, and preferably water contents between 0.1 and 0.2% by weight are particularly advantageous.

In order to keep the catalyst at the required moisture content it is necessary to maintain the water content of the hydrocarbon streams charged to the process at a very low value. The water content of the total hydrocarbon charge should be less than 0.25% by weight, and preferably less than 0.02% by weight.

Control and correlation of the reaction conditions in the reaction zones A, B and C are essential to the successful operation of the present invention.

Conditions suitable for operation of alkylation zone A are described in detail in co-pending patent application Serial No. 518,269, filed on June 27, 1955, in the name of de Keizer and Max. These conditions include pressures in the range from 10 to 80 atmospheres absolute, sufficient to maintain the reaction mixture in liquid phase; temperatures in the range between 160° and 300° C. and preferably in the range between 180° to 240° C.; liquid hourly space velocities (L. H. S. V.) in the range between 4 and 100 v./v./hr.; and a ratio of aromatic to propylene in the charge to the alkylation zone of at least 2:1 and preferably in excess of 5:1. Ratios as high as 12:1 may be employed but values in the range between 5 and 8:1 are preferred. The high liquid hourly space velocities in excess of 10 to 20 are suitable only if crude cumene is not added to the process in substantial amounts.

The following conditions are suitable for operation of isomerization zone B, when using catalyst of the above-described type:

The most favorable results are obtained when the reaction is carried out at a temperature in the range between 100° and 300° C.; temperatures within this range will be correlated with other conditions for best results.

The pressure employed may also vary in correlation with other conditions but is preferably in the range between 10 and 80 atm., abs. The pressure should be sufficient to maintain the reactants in liquid phase at the temperature employed.

The optimum flow rate will also depend on correlation with other factors such as catalyst activity and reaction temperature. It has been found, however, that the rate at which the mixture is contacted with the catalyst should generally be relatively low to obtain the favorable results desired. In most cases, a liquid hourly space velocity (L. H. S. V.) of less than 5 v./v./hr. is required to obtain favorable results. Best results were obtained at values below 3 v./v./hr.

The following conditions are suitable for operation of transalkylation zone C, when using catalyst of the above-described type:

Good results are obtained when the reaction is carried out at a temperature in the range between 160° and 350° C. Very good results are obtained in the range between 200° and 300° C. Temperatures within this range will be correlated with other conditions for best results.

The pressure employed may also vary in correlation with other conditions but is preferably in the range between 10 and 80 atm., abs. The pressure should be sufficient to maintain the reactants in liquid phase at the temperature employed.

The optimum flow rate will also depend on correlation with other factors such as catalyst activity and reaction temperature. It has been found, however, that the rate at which the mixture is contacted with the catalyst should generally be relatively low to obtain the favorable results desired. In most cases, a liquid hourly space velocity (L. H. S. V.) of less than 5 v./v./hr. is required to obtain favorable results. Best results were obtained at values below 3 v./v./hr.

The operation of isomerization zone B is illustrated by means of Examples I, II and III below and the operation of transalkylation zone C by means of Examples IV, V and VI.

EXAMPLE I

A mixture of diisopropyl benzenes consisting of 14% o-, 14% m- and 72% p-diisopropyl benzene was passed over an aluminasilica catalyst at a pressure of 60 atm. and an L. H. S. V.=2 at temperatures of 120° C., 160° C., 200° C. and 240° C. The catalyst used was previously dried at 450° C., after which it was found to have a water content of approximately 0.2% by weight. In a preceding analysis the catalyst was found to have a loss on heating of 1.5% by weight as a result of heating to a temperature of 950° C. The following composition was found after this heating:

11.6% by weight of $Al_2O_3$
88.4% by weight of $SiO_2$
and traces of Fe, Na, K and Ca.

The results obtained are shown in Table I.

Everywhere in this and the following examples, the term "tri" or triisopropyl benzene means the mixture of compounds which remains after the para-di-isomer has been separated from the alkylation reaction mixture. This mixture contains higher alkylated products in addition to the tri-isopropyl benzenes.

Table I

| Temp., °C. | Isomer composition of the resulting "di"-fraction | | | "di"-conversion, mol percent | Amount hereof converted to— | | |
|---|---|---|---|---|---|---|---|
| | Percent o | Percent m | Percent p | | benzene, mol percent | cumene, mol percent | "tri", mol percent |
| 120 | 14 | 14 | 72 | 0 | | | |
| 160 | 14 | 17 | 69 | 0 | | | |
| 200 | 3 | 33 | 64 | 13 | | 53.5 | 46.5 |
| 240 | 1 | 54 | 45 | 39.7 | 2.7 | 46.0 | 51.3 |

EXAMPLE II

Starting from a mixture consisting of 30% of o-, 67% of m- and 3% of p-diisopropyl benzene, at a temperature of 260° C. but otherwise the same reaction conditions as mentioned in Example I, the "di" isomer product contained 3% of o-, 72% of m-, and 25% of p-diisopropyl benzene. 40% of diisopropyl benzene was converted, the products thereof being 3.4% benzene, 55.4% cumene, and 41.2% triisopropyl benzene or higher alkylated product.

EXAMPLE III

Mixtures of diisopropyl benzenes, the isomer composition of which is shown in Table II, were passed at different flow rates over the catalysts mentioned in Example I, at 200° C. The effect of these L. H. S. V.'s on the composition of the di-isomer fraction obtained is shown in the table.

Table II

| L. H. S. V. | | Composition of the fraction consisting of di-isomers | | | Mol percent diconversion as a result of transalkylation to cumene and "tri" |
|---|---|---|---|---|---|
| | | Percent ortho | Percent meta | Percent para | |
| | before the experiment | 14 | 14 | 72 | |
| 2 | after the experiment | 3 | 33 | 64 | 13 |
| 5 | do | 12 | 18 | 70 | 0 |
| | before the experiment | 18 | 23 | 59 | |
| 10 | after the experiment | 15 | 26 | 59 | 0 |

The above table thus shows that as the L. H. S. V. increases, the amount or ortho-di-isomer decreases to a relatively less degree.

EXAMPLE IV

A. A mixture of tri-isopropyl benzenes and benzene in a molar mixing ratio of 1:2 was passed over a cracking catalyst having the same analysis as that of Example I, at a temperature of 220° C. and at a pressure of 60 atm., at different L. H. S. V.'s. The results obtained are shown in Table III.

Table III

| L. H. S. V. | Converted "tri," Percent | Composition of the reaction product | |
|---|---|---|---|
| | | Ratio, Cumene:"di" | "p-di" content in the di-fraction in percent |
| 2 | 67 | 1:1 | 34 |
| 5 | 8 | 1:1 | 32 |

B. Afterwards the tests were repeated at a temperature of 260° C., the remaining conditions being kept the same. The results obtained are shown in Table IV.

Table IV

| L. H. S. V. | Converted "tri", Percent | Composition of the reaction product | |
|---|---|---|---|
| | | Ratio, Cumene:"di" | "p-di" content in the difraction in percent |
| 2 | 79 | 1 | 33 |
| 5 | 47 | 1 | 38 |

The tests were repeated once again under the same conditions as stated in Example IV B, but with a molar ratio of benzene:"tri" of 1:2, in which case 65 and 38 mol percent of the "tri" fraction were converted at an L. H. S. V. of 2 and 5, respectively.

EXAMPLE V

A mixture of di-isopropyl benzenes, consisting of 31% ortho, 66% meta and 3% para-isomer, was passed with benzene in a molar ratio of di-isopropyl benzenes:benzene of 1:1 over the same catalyst as in Example I, at different temperatures with an L. H. S. V. of 2 at a pressure of 60 atm. The results are tabulated in Table V.

Table V

| Temp. | "di" conversion | Composition of the reaction mixture | | | | |
|---|---|---|---|---|---|---|
| | | Mol ratio, Cumene:"tri" | Composition of the resultant "di" fraction | | | |
| | | | Percent o | Percent m | Percent p | |
| 200 | 14 | 3.5:1 | 10 | 79 | 11 | |
| 220 | 24 | 6:1 | 4 | 77 | 19 | |
| 260 | 40 | 16:1 | 2 | 71 | 27 | |
| 280 | 47 | 17:1 | 3 | 69 | 28 | |

Under the same conditions another test was carried out with a molar ratio of di-alkyl benzenes: benzene of 1:2, in which a 79% conversion was obtained at a temperature of 260° C.

EXAMPLE VI

In the following tests a mixture consisting of (1) benzene, (2) a di-isopropyl benzene mixture as described in Example V, and (3) a tri-isopropyl benzene mixture was passed over the same catalyst as used in Example I at a temperature of 260° C. and a pressure of 60 atm. with different L. H. S. V.'s. The mol ratio of the components (1), (2) and (3) in the mixture as introduced into the reactor was 6:2:1.

The results are tabulated in Table VI.

Table VI

| L. H. S. V. | "di" conversion, percent | "tri" conversion, percent | Quantity of "p-di" in the "di" fraction in the reaction mixture, percent |
|---|---|---|---|
| 2 | 11 | 74 | 29 |
| 5 | 0 | 44 | 21 |

We claim as our invention:

1. A process for the continuous production of diisopropyl benzene isomers of ortho-diisopropyl benzene which comprises, in combination: charging propylene to an alkylation zone to contact cumene therein in liquid phase in the presence of cracking catalyst at conditions including a temperature in the range between 160° and 300° C. and a liquid hourly space velocity of at least 4 v./v./hr. to produce a mixture comprising diisopropyl benzenes and polyisopropyl benzenes; subjecting said mixture to fractional distillation to recover therefrom as separate streams at least: (1) a fraction comprising essentially meta- and ortho-diisopropyl benzene, (2) a fraction comprising essentially para-diisopropyl benzene, (3) a fraction comprising essentially polyisopropyl benzenes, and cumene; passing at least said fraction (1) and at most both said fractions (1) and (2) to an isomerization zone wherein they are contacted in liquid phase with a cracking catalyst at conditions including a temperature in the range between 100° and 300° C. and a liquid hourly space velocity of less than 5 v./v./hr. and recovering therefrom an isomerization product containing no more than 5% ortho-diisopropyl benzene (based on total diisopropyl benzenes); passing said polyisopropyl benzene fraction (3) and at least an approximately equal molar amount of at least one compound of the group consisting of benzene and cumene to a transalkylation zone wherein they are contacted in liquid phase with a cracking catalyst at conditions including a temperature in the range between 160° and 350° C. and a liquid hourly space velocity of less than 5 v./v./hr. and recovering therefrom a transalkylation product comprising a substantial proportion of diisopropyl benzenes containing no more than 5% thereof as ortho-diisopropyl benzene; subjecting said isomerization product and said transalkylation product to fractional distillation and recovering therefrom at least one of the diisopropyl benzene isomers of ortho-diisopropyl benzene substantially free of ortho-diisopropyl benzene in substantial yield, and further recovering a cumene fraction from at least the distillation of said transalkylation product; and adding cumene recovered from all distillations, benzene recovered from all distillations and fresh aromatic feed to at least one of the zones in which diisopropyl benzene is produced by addition of alkyl groups to at least one feed compound selected from the group consisting of benzene and cumene.

2. A process according to claim 1 in which said cracking catalyst is, in each case, a siliceous catalyst containing no more than 3.5% water.

3. A process for the continuous production of meta-diisopropyl benzene which comprises, in combination: charging propylene to an alkylation zone to contact cumene therein in liquid phase in the presence of a cracking catalyst at conditions including a temperature in the range between 160° and 300° C. and a liquid hourly space velocity of at least 4 v./v./hr. to produce a product comprising diisopropyl benzenes and polyisopropyl benzenes; subjecting said product to fractional distillation to recover therefrom as separate streams at least: (1) a fraction comprising essentially benzene, (2) a fraction comprising essentially cumene, (3) a fraction comprising essentially meta- and ortho-diisopropyl benzene, (4) a fraction comprising essentially para-diisopropyl benzene, and (5) a fraction comprising essentially polyisopropyl benzenes; passing at least said fraction (3) to an isomerization zone; passing at least said fraction (5) together with at least an approximately equal molar amount of at least one compound of the group consisting of benzene and cumene to a transalkylation zone; distributing all of said fraction (4) between the charges to said isomerization and said transalkylation zones; contacting the charge to said isomerization zone therein in liquid phase with a cracking catalyst at conditions including a temperature in the range between 100° and 300° C. and a liquid hourly space velocity of less than 5 v./v./hr. and recovering from said isomerization zone a product containing no more than 5% ortho-diisopropyl benzene (based on total diisopropyl benzenes); contacting the charge to said transalkylation zone therein in liquid phase with a cracking catalyst at conditions including a temperature in the range between 160° and 350° C. and a liquid hourly space velocity of less than 5 v./v./hr. and recovering therefrom a transalkylation product comprising a substantial proportion of diisopropyl benzenes containing no more than 5% thereof as ortho-diisopropyl benzene; subjecting said isomerization product and said transalkylation product to fractional distillation and recovering therefrom at least (6) a para-diisopropyl benzene fraction and (7) a meta-diisopropyl benzene fraction substantially free of ortho-diisopropyl benzene; distributing all of said fraction (6) between the charges to said isomerization and said transalkylation zones; recovering said fraction (7) as product of the process; further recovering a cumene fraction from at least the distillation of said transalkylation product, and adding cumene recovered from all distillations and benzene to at least one of the zones in which diisopropyl benzene is produced by adidtion of alkyl groups to at least one feed compound selected from the group consisting of benzene and cumene.

4. A process according to claim 3 in which said cracking catalyst is, in each case, a siliceous catalyst containing no more than 3.5 water.

References Cited in the file of this patent

UNITED STATES PATENTS

| | | |
|---|---|---|
| 2,395,198 | Schulze | Feb. 19, 1946 |
| 2,436,698 | Oblad | Feb. 24, 1948 |
| 2,730,557 | Max et al. | Jan. 10, 1956 |
| 2,744,150 | Enos | May 1, 1956 |
| 2,756,261 | Fetterly | July 24, 1956 |

FOREIGN PATENTS

| | | |
|---|---|---|
| 526,954 | Belgium | Sept. 4, 1954 |
| 526,955 | Belgium | Sept. 4, 1954 |
| 1,088,332 | France | Sept. 8, 1954 |
| 1,107,270 | France | Aug. 3, 1955 |
| 749,186 | Great Britain | May 23, 1956 |
| 749,187 | Great Britain | May 23, 1956 |
| 1,125,499 | France | Oct. 31, 1956 |